Dec. 23, 1941.  W. G. EALY  2,266,855
AUTOGRAPHIC DEVICE
Filed Jan. 14, 1939  3 Sheets-Sheet 1

William George Ealy
Inventor

By *Earl Barnet*
His Attorney

Dec. 23, 1941.   W. G. EALY   2,266,855
AUTOGRAPHIC DEVICE
Filed Jan. 14, 1939   3 Sheets-Sheet 2
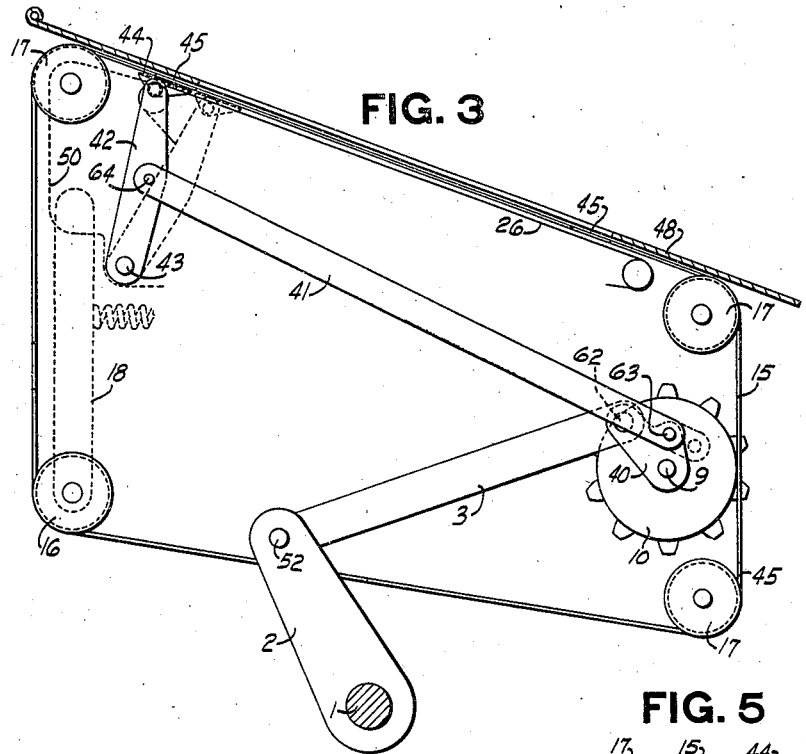
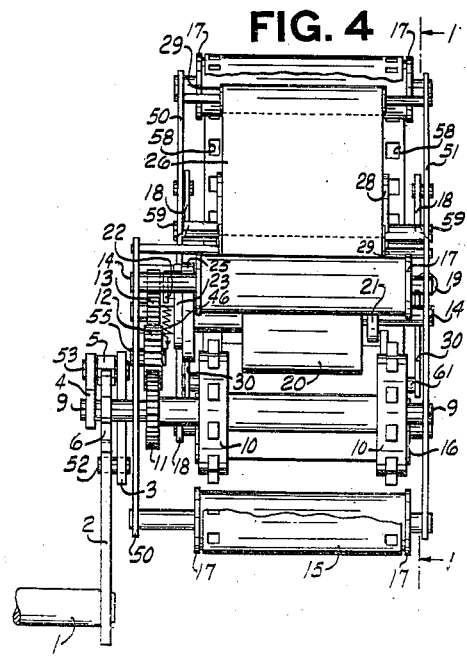
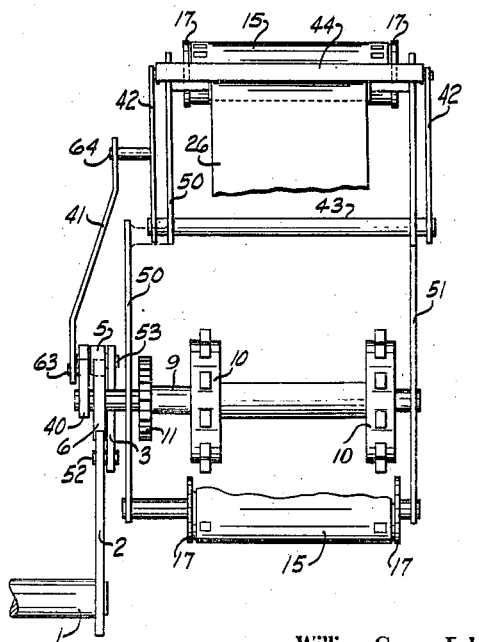
William George Ealy
Inventor
By Pearl Beust
His Attorney Dec. 23, 1941.   W. G. EALY   2,266,855
AUTOGRAPHIC DEVICE
Filed Jan. 14, 1939   3 Sheets-Sheet 3

William George Ealy
Inventor
By Earl Beust
His Attorney

Patented Dec. 23, 1941

2,266,855

UNITED STATES PATENT OFFICE 2,266,855

AUTOGRAPHIC DEVICE

William George Ealy, London, England, assignor to The National Cash Register Company, Dayton, Ohio, a corporation of Maryland Application January 14, 1939, Serial No. 250,861
In Great Britain September 30, 1938

19 Claims. (Cl. 281—8)

This invention relates to cash registers and similar accounting machines, and is particularly directed to improvements in autographic devices for such machines.

The machine embodying the present invention is provided with a total printing means for recording the total of the transactions at the end of a business period, such, for example, as a day. As a rule, such total printing means is accessible only to some authorized person whose duty it is to ascertain the amount of cash taken in during said business period, and to compare this actual amount of cash with the printed total of the amount that should be in the cash drawer.

Often the actual amount of cash and the printed total do not agree, due to one circumstance or another. Sometimes the amount in the cash drawer exceeds the amount recorded by the total printing means and sometimes it is less. In the former case, the authorized person, if dishonest, can appropriate the amount in the cash drawer in excess of the printed total, and merely record in writing an amount corresponding to said printed total.

This is obviously an undesirable condition and the present invention relates to an improved mechanism for safe-guarding against such malpractice.

Therefore, it is broadly an object of this invention to provide means for informing those in authority whether or not the actual cash on hand, at the end of a certain business period, was recorded autographically prior to the mechanical recording of a total of all the cash transactions for said period.

Another object is to provide an autographic strip mechanism for comparing a hand recording of the actual amount of cash on hand, at the termination of a certain business period, with a mechanical recording of the total amount of cash which should be on hand at the termination of said period.

A further object is the provision of an autographic strip mechanism for verifying the actual amount of cash on hand at the end of a certain business period in comparison to a mechanical recording of the total cash transactions for said period.

Still another object is to furnish means to render a hand recording of the actual cash on hand, at the end of a business period, inaccessible to alteration upon the performance of a machine operation to mechanically record a total of all the cash transactions for said period.

A further object is to provide an endless curtain device, having apertures therein, for rendering successive portions of a record strip accessible for the autographic recording of certain data thereon and inaccessible for the alteration of said data upon a machine operation to mechanically record similar data to be compared with said autographic data.

With these and incidental objects in view, the invention includes certain novel features of construction and combinations of parts, the essential elements of which are set forth in appended claims and a preferred form or embodiment of which is hereinafter described with reference to the drawings which accompany and form a part of this specification.

In said drawings:

Fig. 3 is a side elevation, as observed from the left, of the mechanism for closing the writing aperture while the autographic strip is being advanced.

Fig. 4 is a front view of the autographic mechanism with a portion of the endless shutter and the autographic strip cut away for clearness.

Fig. 5 is a front view of the mechanism shown in Fig. 3.

General description

Figure 1:
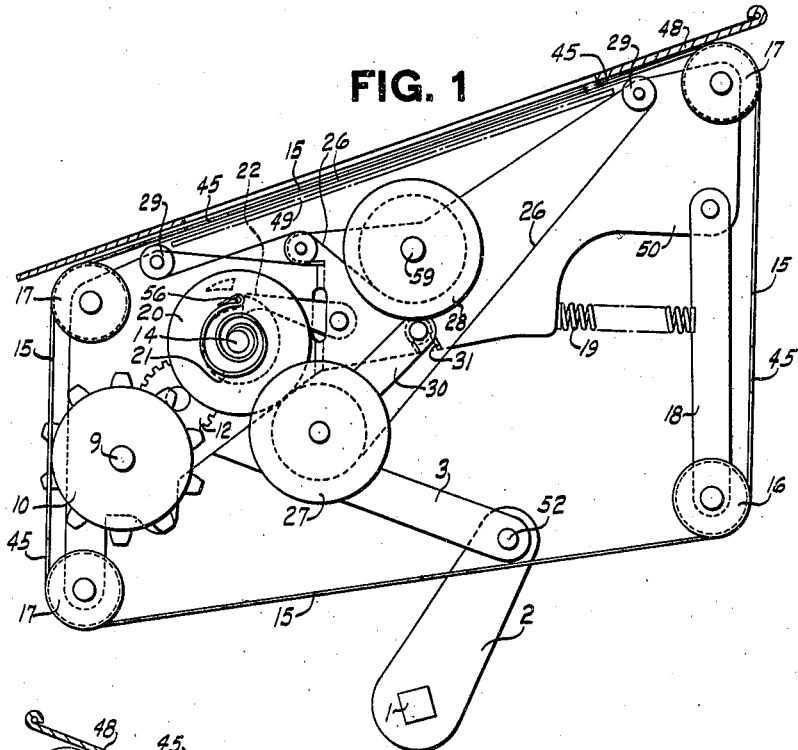
Fig. 1 is a side elevation of the autographic mechanism, as observed from the right.

A known type of autographic mechanism for the same purpose as the autographic mechanism of this invention comprises an autographic strip, a portion of which is accessible through an aperture in the cabinet or in an auxiliary lid giving access to the autographic strip, as shown in United States Patent No. 2,170,517 issued to Frederick Emberson on August 22, 1939.

With this type of mechanism, at the end of a business period, such as a day, a person in authority counts the cash in the cash drawer of the register and writes down the actual amount of cash in said cash drawer upon the portion of the autographic strip accessible through the opening or aperture in the cabinet. Next a total printing operation is performed to print a total of all the cash transactions for said business period upon another record strip, and during this total printing operation the autographic strip is advanced to move the written record thereon beyond the aperture and to present a new portion of said autographic strip opposite said aperture. In case a total printing operation is performed, without the person in authority writing down the actual amount of the cash upon the autographic strip, a blank portion of said strip is advanced beyond the aperture, thereby notifying another authorized person, who has access to the autographic strip, that a total printing operation has been performed without the actual amount of the cash having been written upon the autographic strip.

The present invention clearly distinguishes from the above in that instead of advancing an autographic strip step by step past an aperture in the cabinet, a curtain device is provided, having a series of apertures therein, and is itself advanced step by step so that each aperture therein traverses a stationary portion of the autographic strip. After one aperture in the curtain has traversed a predetermined portion of the autographic strip, said strip is fed to present a new portion thereof to the succeeding or following aperture in the endless shutter.

In this example, as in the preceding one, the person in authority, at the close of the business period, counts the cash in the cash drawer of the register and writes the actual amount of the cash upon the autographic strip through the aperture in the curtain, after which a total printing operation is performed in which a total of all the cash transactions for the business period is printed upon another record strip and the curtain advanced to conceal the hand-written figure of the actual cash and to reveal a new portion of the autographic strip.

After one of the apertures in the endless shutter has traversed the predetermined portion of the autographic strip and while the next aperture is moving into writing position, it might be possible for a dishonest operator to insert some instrument through the new aperture and thus interfere with the feeding of the autographic strip, for the purpose of wilfully altering any notation thereon after operation of the total printing mechanism has revealed to the operator the amount of the last total. To overcome this possibility, a shutter mechanism is provided which, during total printing operations, moves in unison with the aperture now moving to writing position, thus closing the aperture while the autographic strip is being fed, thereby preventing any interference with the feeding of said autographic strip.

The mechanisms outlined in general above will now be described in detail.

*Detailed description*

Figure 6:
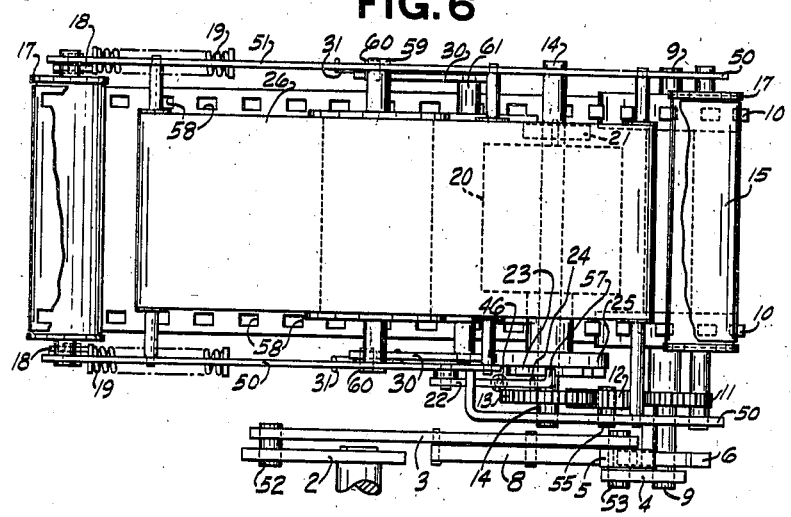
Fig. 6 is a plan view of the mechanism shown in Figs. 1 and 2.

The present invention is embodied in a machine of the type disclosed in Letters Patent of the United States No. 1,817,815, issued August 4, 1931, to C. W. Green, to which reference may be had for full particulars concerning the total printing mechanism and other mechanisms referred to in the following specifications:

Referring to the drawings, the autographic mechanism is supported by side frames 50 and 51, the former being bent, as shown in Fig. 6, to accommodate certain parts of the mechanism, and both of these frames are suitably attached to the main framework of the machine, not shown. A closure or lid 48 (Figs. 1, 2, and 3,) hinged on the cabinet (not shown) which encloses the mechanism of the machine, permits access to the autographic mechanism. An aperture is provided in the lid 48 and is of such width and length as to permit autographic notations on an autographic strip, as will be described later, but without permitting improper manipulation of any of the parts of the autographic mechanism. The opening and closing of the closure 48 is controlled by a lock (not shown) the key to which is in the possession of some responsible person.

A shaft 1 (Figs. 1, 2, 4 and 6) journaled in the framework of the machine and actuated only during total printing operations, has secured thereon an arm 2, which carries at the upper end thereof a stud 52, which pivotally supports one end of a link 3, the upper end of which is pivotally connected at 53 to a crank 4 free on a shaft 9 journaled in the frames 50 and 51. Also free on the stud 53, between the link 3 and the crank 4, is a pawl 5 (Figs. 2, 4 and 6) urged clockwise, as viewed in Fig. 2, by a spring 8 into engagement with the teeth of a ratchet wheel 6 secured on the shaft 9. Retrograde movement of the ratchet 6 is prevented by a pawl 7 pivoted at 54 to the frame 50, said pawl being spring-urged into engagement with the teeth of said ratchet. Fast on the shaft 9, (Figs. 2, 4 and 6) is a gear 11 and a pair of pin wheels 10.

An endless belt type of curtain 15, which is of greater width than the aperture in the lid 48 (Figs. 1 to 6) is supported by guide rollers 16 and 17, the rollers 17 being rotatably supported on studs extending between the frames 50 and 51 and the roller 16 being supported between two similar arms 18 (Figs. 1, 2, 4 and 6) pivoted to the frames 50 and 51 and said arms 18 are normally urged rearwardly by compressible springs 19 to hold the curtain 15 taut at all times. The curtain 15 has along its margins equally spaced feeding holes 58, engageable by the pins on the pin wheels 10 to cause the curtain to be positively gripped and fed by said wheels. The curtain 15 is provided with a series of equally spaced writing apertures 45 (Figs. 1, 2 and 3,) which permit the operator to write on an exposed section of an autographic strip 26 the actual amount of cash in the cash drawer before a total printing operation during which a total of all the cash transactions is printed upon another record strip.

The autographic record strip 26 (Figs. 1, 2 and 4) is fed from a supply roll 28, mounted on a shaft 59 supported by the frames 50 and 51, around guide rollers 29, over the top of a writing table 49 and finally onto a receiving roll 27. The receiving roll 27 is supported by a cross rod 61, extending between arms 30 (see also Fig. 6) pivoted on studs 60 in the frames 50 and 51. The arms 30 and the receiving roll 27 are urged counter clockwise by torsion springs 31, so that the outer surface of the receiving roll will at all times yieldingly engage the feeding surface of a frictional feeding drum or cylinder 20.

Figure 2:
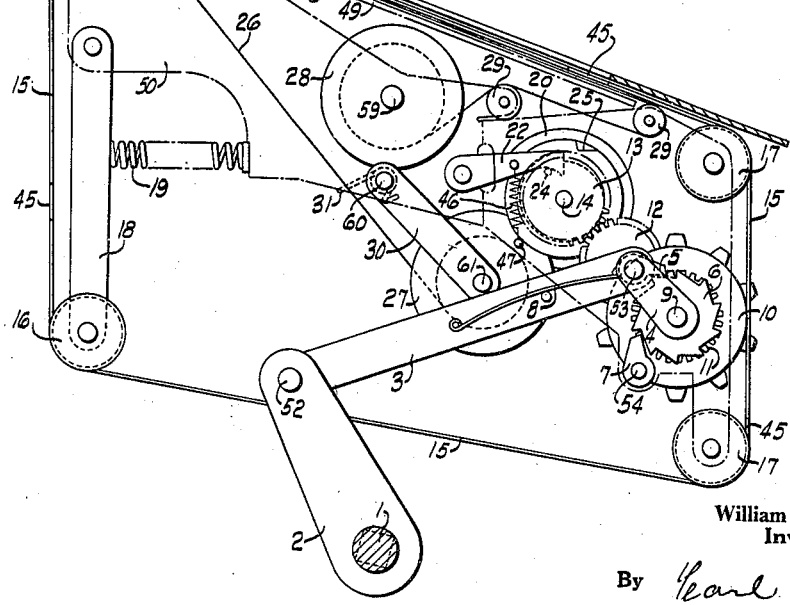
Fig. 2 is a side elevation of the autographic mechanism as observed from the left.
Figure 7:
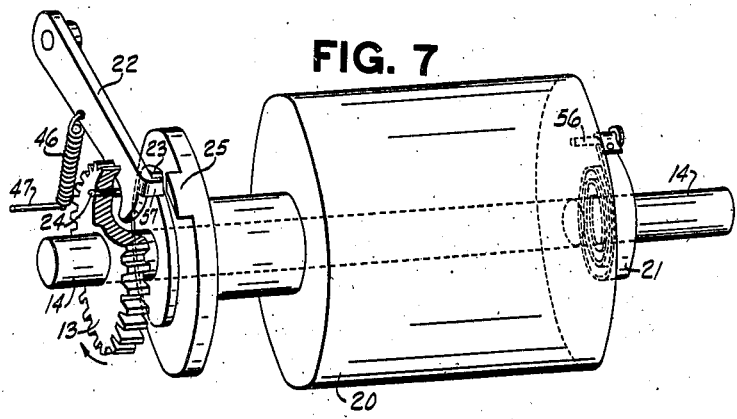
Fig. 7 is a perspective view of the record material feeding drum or roller and other mechanism associated therewith.

Referring to Figs. 2 and 6, meshing with the gear 11 is an idler gear 12, mounted on a stud 55 in the frame 50, said idler in turning meshing with a gear 13, similar in size to the gear 11 and fast on a shaft 14 journaled in the frames 50 and 51. Loose on the shaft 14 is a drum 20 (see also Figs. 1 and 7) having a hub upon which is secured a stop disc 23 and a cam 25. One end of a flat coiled spring 21 is secured to a stud 56 in the drum 20 and the other end of said spring is secured to the shaft 14, said spring 21 being adapted to drive the drum 20 to feed the autographic material in a manner presently to be described.

Pivoted on a stud in the side frame 50 is a pawl 22 (Figs. 2, 6 and 7) a bent-over ear 57 of which normally engages a projection on a disc 23 under influence of a spring 46 anchored to the pawl 22 and to a stud 47 in the frame 50. The gear 13 carries a stud 24 which extends inwardly therefrom into cooperative relationship with a downwardly extending camming projection of the pawl 22, and under certain conditions said stud in cooperation with said camming projection disengages the ear 57 of said pawl from the projection of the disc 23, as will be explained later.

As previously brought out, the autographic strip 26 (Fig. 2) remains stationary while one of the apertures 45, in the curtain 15, traverses the entire portion of said autographic strip available through the opening in the lid 48, said portion being supported for writing purposes by the table 49.

A normal operation of the machine is as follows: The machine operator first counts the cash in the cash drawer and at the time of such counting is unaware of the total amount of the cash transactions which have to be accounted for according to the amount of such transactions standing on the wheels of the totalizer, said totalizer being inaccessible to the operator. At this time it is to be assumed that one of the apertures 45 in the curtain 15 is in its first writing position at the top of the opening in the lid 48. Through this aperture 45 the operator writes on the autographic strip 26 the total of the cash which has just been counted. After having written down the amount of the actual cash, it now becomes necessary for the operator to perform a total printing operation during which the amount of the cash to be accounted for, that is, the total amount of the cash transactions for a particular business period, is printed upon the usual detail strip (not shown).

Operation of the total printing mechanism rocks the shaft 1 slightly clockwise, as viewed in Fig. 2, which, by means of the arm 2, and the link 3, rocks the crank 4 clockwise in unison therewith. Clockwise movement of the crank 4 causes the pawl 5 to advance the ratchet 6 one tooth space, and as said ratchet is secured on the shaft 9, said shaft, the gear 11 and the pin wheels 10 are also advanced in unison therewith one step or the equivalent of one tooth of said ratchet 6. The pin wheels 10, in cooperation with the feed perforations 58 (Figs. 2 and 6) in the curtain 15 advance said curtain a sufficient distance to move the aperture 45, through which the operator wrote the amount of the cash on the autographic strip, downwardly or toward the front of the machine to expose a fresh portion of said autographic strip and to cause a solid portion of the curtain 15 to conceal and render inaccessible the written amount of the cash at approximately the same time that the printed amount of the cash becomes known to the operator.

As an additional precaution, the aperture 45 may be less in width than the feed given to the curtain 15, so that a previously written notation cannot be altered after said curtain has been advanced, by inserting a pencil point under the top edge of said aperture.

The gear 11 being fast on the shaft 9 (Figs. 2 and 6) moves in unison with said shaft, when it is advanced in the manner explained above, and as said gear is connected by the idler gear 12 to the gear 13 it is obvious that said gear 13 (see also Fig. 7) and the shaft 14 move step by step in unison therewith upon each total printing operation to wind the spring 21. The ear 57 of the pawl 22, in cooperation with the projection of the disc 23 hold said disc, the cam 25 and the drum 20 stationary until the gear 13 makes one complete revolution. The pin 24, in the gear 13, is located in relation to the apertures 45, in the curtain 15, so that when any one of said apertures has completely traversed the exposable portion of the autographic strip 26, said gear 13 will have completed one revolution, whereupon said pin 24, in cooperation with the camming surface on the downwardly extending projection of the pawl 22, rocks said pawl upwardly or counter clockwise to disengage the ear 57 thereof from the projection of the disc 23. This releases the drum 20 to the action of the wound-up spring 21, which immediately rotates said drum clockwise, as viewed in Figs. 2 and 7, one complete revolution. Immediately after the pin 24 has rocked the ear 57 off of the projection of the disc 23, said pin moves beyond the projection of said pawl, permitting the spring 46 to return the ear 57 into contact with the periphery of the disc 23, and said ear rides on said periphery until it again engages the projection of said disc 23 to terminate rotation of said drum 20, at the end of one revolution. If for any reason the spring 46 (Fig. 7) does not return the pawl 22 counter clockwise, so that the ear 57 will be engaged by the projection of the disc 23, a camming projection on the cam 25, in cooperation with said ear 57, positively returns said ear downwardly into the path of the projection on the disc 23.

As previously explained, the springs 31 (Figs. 2 and 6) in cooperation with the arms 30 maintain the surface of the receiving roll 27 of the autographic strip in contact with the feeding surface of the drum 20 and said springs are sufficiently strong to cause the proper frictional engagement of said parts so that rotation of said drum 20, as explained above, will rotate the receiving roll 27 counter clockwise, as viewed in Fig. 2 to advance the entire exposed portion of said autographic strip from opposite the opening in the lid 48 and to place an unused portion of said autographic strip opposite said opening.

During the above movement of the drum 20 a new aperture 45 in the curtain 15 is moving into writing position at the top of the exposable portion of the autographic strip 26 and there is a remote possibility that, just prior to or during the feeding of the autographic strip, a dishonest operator could insert some instrument through the new aperture 45 and hold the autographic strip against feeding, for the purpose of wilfully altering any written notation on said strip, after said operator has become aware of the printed total of the cash transactions.

In order to obviate the above possibility, mechanism has been provided for temporarily closing the new aperture 45, as it is moving into its first writing position.

Referring particularly to Figs. 3 and 5, the forward end of the link 3, freely engages a stud 62 in an arm 40 free on the shaft 9. The arm 40 carries a stud 63, upon which is pivoted the forward end of a link 41, the rearward end of which is pivoted on a stud 64 in one of two similar arms 42, secured in fixed relation to each other on a shaft 43 journaled in the frames 50 and 51. Extending between and supported by the upper ends of the arms 42 is a shutter 44, interposed between the curtain 15 and the autographic strip 26.

Normally the parts just described are in the positions shown in full lines in Fig. 3. However, clockwise movement of the shaft 1 and arm 2, during total printing operations rocks the arm 40 also clockwise, which shifts the link 41, the arm 42 and the shutter 44 forwardly from full-line position to the dot-and-dash position shown in Fig. 3. This moves the shutter 44 opposite the new aperture 45 in the curtain 15, and the timing of the movement of the parts is such that said shutter will obstruct said aperture 45 during the time that the autographic strip 26 is being fed in the manner explained above. When the shaft 1 returns counterclockwise to normal position, as here shown, after having advanced a new aperture 45 in its first writing position at the top of the autographic strip 26, the arm 42 and shutter 44 will likewise be returned counterclockwise to uncover said aperture 45, to permit the first written notation of a new series to be made upon the autographic strip 26.

In order to remove the portion of the autographic strip 26 containing one or more series of written notations, it is necessary for some person in possession of the key to the lid 48 to unlock said lid, through which access to the autographic strip and its supply and receiving rolls, may be had.

While the form of mechanism herein shown and described is admirably adapted to fulfill the objects primarily stated, it is to be understood that it is not intended to confine the invention to the one form or embodiment herein disclosed, for it is susceptible of embodiment in various forms all coming within the scope of the claims which follow.

What is claimed is:

1. In a machine of the class described, having an autographic strip, the combination of a curtain device; supporting means for said curtain device adapted to maintain said curtain device in a position overlying the autographic strip, said curtain device having an aperture therein through which the autographic strip is accessible for the purpose of writing data thereon; means including perforations in the curtain and pinwheels cooperating therewith to move said curtain a certain increment each operation to conceal a portion of the autographic strip containing data written thereon prior to an operation and to reveal a new portion of said strip after said operation.

2. In a machine of the class described, having an autographic strip, the combination of an endless belt-like curtain device overlying the autographic strip, said curtain device having apertures therein, giving access to the autographic strip for the writing of data thereon; and means effective during each operation of the machine, to impart a fixed increment of movement to the curtain to cause the apertures to successively reveal and conceal different portions of the autographic strip to render data written on said strip prior to an operation inaccessible during and after said operation.

3. In a machine of the class described, having an autographic strip and a housing for the strip having a writing opening to give access to the autographic strip for writing notations thereon, the combination of a continuous belt-like curtain between the housing and the strip, said curtain having an aperture therein, giving access to a portion of the autographic strip for the writing of data thereon; pinwheels coacting with perforations in the curtain; and means, effective during a machine operation, to actuate the pinwheels to move the curtain a given increment, in relation to the autographic strip, to render the portion of said autographic strip, which was accessible through the aperture prior to said operation, inaccessible and to render a new portion of said autographic strip accessible.

4. In a machine of the class described, having an autographic strip, the combination of a continuous belt-like curtain located above the strip to obscure the strip from the operator, said curtain having an aperture therein giving access to a portion of the autographic strip for the writing of data thereon; pinwheels coacting with perforations in the curtain; and means including a ratchet device to impart a step of movement to the pinwheels and the curtain during each total printing operation to advance said curtain and the aperture relatively to the autographic strip to render data written on said strip, prior to a machine operation, inaccessible during and after said operation.

5. In a machine of the character described, having an autographic strip, the combination of an endless belt-like curtain positioned to prevent access to the strip, said curtain having an aperture therein giving access to a portion of the autographic strip for the writing of data thereon; pinwheels coacting with perforations in the curtain; a ratchet device operatively connected to the pinwheels; and means effective in machine operations to actuate the ratchet device whereupon said ratchet device imparts one step of movement to the pinwheels to advance the curtain and the aperture to render data written on the autographic strip prior to a machine operation, inaccessible after said operation.

6. In a machine of the character described, having an autographic strip, the combination of a continuous belt-like curtain adapted to prevent access to the strip, said curtain having an aperture therein through which access may be had to a portion of the autographic strip for the writing of data thereon; pinwheels coacting with perforations in the curtain; a ratchet device operatively connected to the pinwheels; and means, including a rock-shaft which operates during each machine operation, to actuate the ratchet device, which in turn imparts one step of movement to the pin wheels to advance the curtain and the aperture one increment of movement to render data written on the autographic strip, prior to a machine operation, inaccessible during and after said operation.

7. In a machine of the class described, having an autographic strip, the combination of a continuous belt-like curtain arranged to overlie the strip, said curtain having a series of equally spaced apertures therein through which access may be had to the autographic strip for the purpose of writing data thereon; means to impart an increment of movement to the curtain during each machine operation to cause one of the apertures to traverse an exposable portion of the autographic strip to successively reveal and conceal different parts of the exposable portion for the writing of data thereon; and means effective, after said one aperture has traversed the exposable portion of the autographic strip, to feed said strip to bring a new portion thereof into position to be traversed by the next aperture in said shutter.

8. In a machine of the character described, having an autographic strip, the combination of a continuous belt-like curtain in front of the strip so located that the strip is hidden from view, said curtain having a series of equally spaced apertures therein, which give access to the autographic strip for the notation of data thereon; means including a ratchet device to impart an increment of movement to the curtain during each machine operation to cause said curtain and one of the apertures to traverse an exposable portion of the autographic strip to successively conceal and reveal different parts of said exposable portion so that data written there on, prior to a machine operation, will be inaccessible after said machine operation; and means rendered effective by the ratchet device to feed the autographic strip after said one of the apertures has traversed the accessible portion thereof to bring a new portion of said strip into position to be traversed by the next aperture in the curtain.

9. In a machine of the character described, having an autographic strip adapted to be fed over a writing table, the combination of a continuous belt-like curtain having a series of equally spaced apertures therein, giving access to the portion of the autographic strip opposite the writing table for the notation of data thereon; pinwheels cooperating with perforations in the curtain; a ratchet device connected to the pinwheels; means to impart an increment of movement to the ratchet device during each machine operation to cause the curtain and one of the apertures to successively conceal and reveal different portions of the autographic strip opposite the writing table, so that data written thereon prior to a machine operation is rendered inaccessible; and means rendered effective by the ratchet device to feed the autographic strip, after said one of the apertures has traversed the portion of said strip opposite the table, to bring a new portion of said strip into position to be traversed by the next aperture.

10. In a machine of the character described, having an autographic strip adapted to be fed from a supply roll over a writing table and onto a receiving roll, the combination of a continuous belt-like curtain having a series of equally spaced apertures therein, which give access to the portion of the autographic strip opposite the writing table for the notation of data thereon; a ratchet device connected to the curtain; means to impart an increment of movement to the ratchet device in machine operations to cause the curtain and one of the apertures to successively conceal and reveal different portions of the autographic strip opposite the writing table, so that data entered thereon, prior to a machine operation, is rendered inaccessible for alteration after said machine operation; and means including a spring driven feed roller frictionally engaged by the receiving roll and adapted to be rendered effective by the ratchet device, after said one of the apertures has traversed the portion of the autographic strip opposite the table, to bring a new portion of said strip into position to be traversed by the next aperture.

11. In a machine of the class described, having an autographic strip adapted to be fed from a supply roll over a writing table and onto a receiving roll, the combination of a continuous belt-like curtain having a series of equally spaced apertures therein giving access to the portion of the autographic strip opposite the writing table for the notation of data thereon; a ratchet device connected to the curtain; means to impart an increment of movement to the ratchet device during each machine operation to cause the curtain and one of the apertures to successively conceal and reveal different portions of the autographic strip opposite the writing table, so that data may be entered thereon prior to a machine operation and rendered inaccessible for alteration after said machine operation; a feed roller frictionally engaged by the receiving roll; a spring to drive the feed roller; means operated by the ratchet device to tension the spring; and means rendered effective by the ratchet device, after said one of the apertures has traversed the portion of the autographic strip opposite the table, to release the feed roller to the action of the spring to cause said feed roller to drive the receiving roll to feed a new portion of said autographic strip into position to be traversed by the next aperture.

12. In a machine of the class described, having an autographic strip adapted to be fed from a supply roll over a writing table and onto a receiving roll, the combination of a continuous belt-like curtain having a series of equally spaced apertures therein giving access to the portion of the autographic strip opposite the writing table for the notation of data thereon; pinwheels cooperating with perforations in the curtain; a ratchet device connected to the pinwheels; means to impart an increment of movement to the ratchet device, in machine operations, to cause the curtain and one of the apertures to successively conceal and reveal different portions of the autographic strip opposite the writing table so that data may be entered thereon prior to a machine operation and rendered inaccessible for alteration after said machine operation; a feed roller arranged to be yieldingly engaged by the receiving roll; a spring to drive the feed roller; means, including a stop disc and a pawl, to normally hold the roller against the action of the spring; means operated by the ratchet device to tension the spring; and means operated by the tensioning means to disengage the pawl from the stop disc, after said one of the apertures has traversed the portion of the autographic strip opposite the table, to cause said feed roller to feed a new portion of said autographic strip into position to be traversed by the next aperture.

13. In a machine of the character described, having an autographic strip, the combination of a continuous belt-like curtain overlying an exposable portion of the autographic strip; a plurality of equally spaced apertures in the curtain adapted, one after the other, to traverse said exposable portions of the autographic strip, thereby giving access to said exposable portion for the purpose of entering data thereon; means to impart an increment of movement to the curtain during each operation to cause data noted on said exposable portion, prior to an operation, to be rendered inaccessible after said operation and to cause a new part of said exposable portion to be rendered accessible for the entering of data; means to feed the autographic strip after one of said apertures has traversed the exposable portion to bring a new portion thereof into position to be traversed by the next aperture; connections controlled for the curtain feeding means to release the strip feeding means; a shutter located between the curtain and said strip to render the strip inaccessible through the aperture while the autographic strip is being fed;

and connections between the shutter and the curtain moving means to cause said shutter to be moved in unison with said curtain to obstruct said next aperture while it is moving to its first data entering position and while the autographic strip is being fed.

14. In a machine of the class described, having an autographic strip, the combination of a continuous belt-like curtain supported to be moved in a path immediately above the strip, said curtain having a plurality of equally spaced apertures therein giving access to the autographic strip for the entering of data thereon; means to move the curtain to bring a new aperture into data entering position as the preceding aperture moves out of data entering position; a shutter between the curtain and the strip and movable between a normal ineffective position and a position which the aperture assumes during its first data entering position; and connections between the curtain moving means and the shutter to cause said shutter to obstruct the apertures as they move to data entering position to render the autographic strip inaccessible through said apertures at that time.

15. In a machine of the class described, having an autographic strip adapted to be fed from a supply roll onto a receiving roll, the combination of masking means adjacent a section of the autographic strip, said masking means provided with an opening to expose a portion of said section of the strip; a feed roller arranged to be yieldingly engaged by the receiving roll; a spring to drive the feed roller; means normally effective to hold the feed roller against the action of the spring; means to feed the masking means step by step to move said opening across the face of said section of the strip; a revolvable member to tension the spring; means actuated by the last-named means to impart an increment of movement to the member each time the masking means is moved; and means operated by the member after said one opening has moved across said section and upon a complete revolution of the member, to render the holding means ineffective to release the spring to thereby cause a new section of the autographic strip to be fed adjacent to the masking means.

16. In a machine of the class described, having a record strip adapted to be fed from a supply roll onto a receiving roll, the combination of a movable shield to cover a section of the record strip, said shield having a plurality of openings one of which is normally adjacent the said section of the record strip; means to move the shield step by step to move said one opening across said section; a feed roller arranged to be yieldingly engaged by the receiving roll; a spring to drive the feed roller; a stop disc connected to the feed roller; a pawl adapted to engage the disc to hold the feed roller against the action of the spring; means comprising a rotatable member to tension the spring; means connected to the shield moving means to rotate the member; and means whereby the member, upon a complete rotation thereof, disengages the pawl from the disc to cause the record strip to be fed by the spring when said one opening passes said section and another one of said openings moves adjacent said section.

17. In a machine of the class described, having an autographic strip adapted to be fed from a supply roll over a writing table and onto a receiving roll, the combination of a movable shield adjacent the strip, said strip having an opening to expose a fraction of the strip; means to feed the shield step by step while the strip remains stationary; a feed roller for the autographic strip; means to retain the receiving roll in yieldable engagement with the feed roller; a spring to drive the feed roller; a stop disc connected to the feed roller; a pawl adapted to normally engage the stop disc to hold the feed roller against the action of the spring; means comprising a rotatable member to tension the spring; a ratchet device connected to the rotatable member; means including a rock-shaft to actuate the shield-moving means and the ratchet device, to cause the ratchet device to impart an increment of movement to the member; and a projection on the member effective on a complete rotation of the member to rock the pawl out of engagement with the stop disc to release the feed roller to the action of the spring to cause the autographic strip to be fed after the opening in the shield reaches a predetermined position.

18. In a machine of the class described, having an autographic strip adapted to remain stationary throughout a plurality of operations of the machine, the combination of an endless curtain device overlying a section of the autographic strip; an aperture in the curtain through which the autographic strip is accessible for the hand recording of data; a main operating means; and a uni-directional driving means connected to the main operating means to move the curtain step by step in the one direction a predetermined increment to cause the aperture therein to expose and conceal successive portions of said section of the stationary autographic strip to render previously-written data inaccessible after each operation of the main operating means.

19. In a device of the character described, having an autographic strip adapted to remain stationary throughout a plurality of operations of the machine, the combination of a curtain device overlying the autographic strip and having therein an aperture through which the stationary autographic strip is accessible for the hand recording of data; operating means; and a uni-directional driving means connected to and operated by the operating means to move the curtain step by step in one direction a given increment in relation to the stationary autographic strip during each machine operation to cause the aperture to expose and conceal successive portions of the stationary autographic strip to render previously-written data inaccessible after an operation of the operating means.

WILLIAM GEORGE EALY.

CERTIFICATE OF CORRECTION.

Patent No. 2,266,855. December 23, 1941.

WILLIAM GEORGE EALY.

It is hereby certified that error appears in the printed specification of the above numbered patent requiring correction as follows: Page 3, first column, line 5, for "a disc" read --the disc--; page 4, first column, line 18, for "in" read --into--; and line 49, claim 1, after "curtain" and before "and" insert a semicolon; page 5, second column, line 71, claim 13, for the word "for" read --by--; and that the said Letters Patent should be read with this correction therein that the same may conform to the record of the case in the Patent Office.

Signed and sealed this 10th day of February, A. D. 1942.

(Seal)

Henry Van Arsdale,
Acting Commissioner of Patents.